Figure 1:
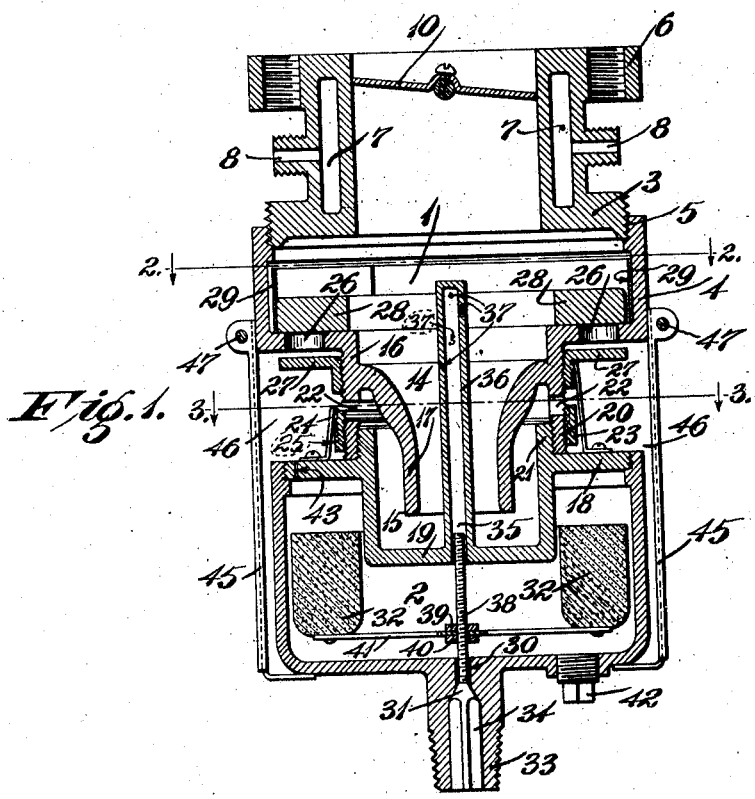

W. P. GRATH.
CARBURETER.
APPLICATION FILED SEPT. 7, 1911.

1,043,692.

Patented Nov. 5, 1912.
2 SHEETS—SHEET 1.

Witnesses:
Edgar S. Farmer
A. M. Holcombe

Inventor:
Walter P. Grath,
By Cauet Cause,
his Attys.

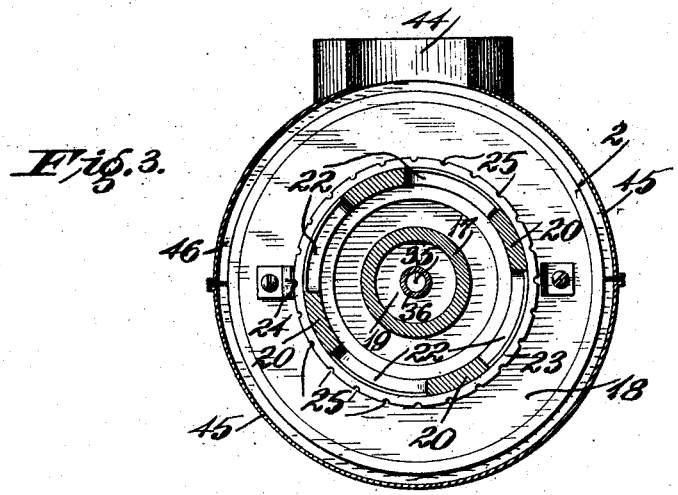
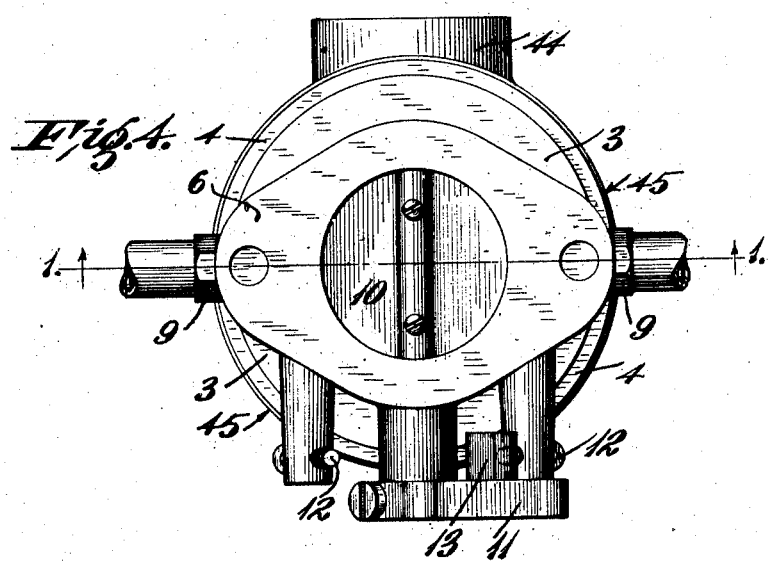

UNITED STATES PATENT OFFICE.

WALTER P. GRATH, OF ST. LOUIS, MISSOURI.

CARBURETER.

1,043,692.
Specification of Letters Patent.
Patented Nov. 5, 1912.

Application filed September 7, 1911. Serial No. 648,201.

*To all whom it may concern:*

Be it known that I, WALTER P. GRATH, a citizen of the United States, and a resident of the city of St. Louis and State of Missouri, have invented a new and useful Improvement in Float-Feed Carbureters, of which the following is a specification.

My invention relates to liquid fuel carbureters of the type commonly used with explosion engines, wherein the fuel supply is regulated by means of a float chamber, and is particularly directed to the form and arrangement of spray nozzle and air passages whereby carburetion of the fuel is secured.

The object of my invention is to provide a liquid fuel carbureter especially adapted to the requirements of automobile, motor boat, and aeroplane explosion engines; which shall be light in weight and compact in design; and which shall give a gaseous fuel mixture suited to the particular needs of such engines under all conditions of operation.

With these objects in view I have devised and constructed the carbureter shown in the drawings accompanying my application and forming a part thereof, and which is fully described herein, embodying certain novel and useful features of my invention which I have particularly pointed out in the appended claims.

Figure 2:
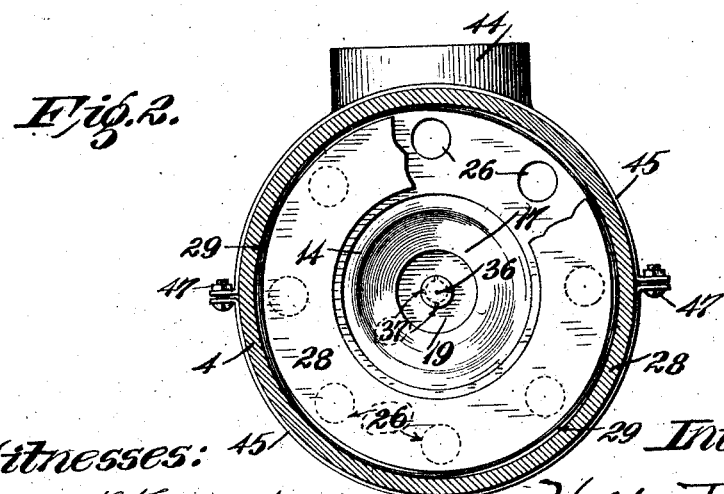

In the drawings, in which like characters are used to designate like parts throughout the several views,—Figure 1 is a vertical section through my device taken on the line 1—1 in Fig. 4; Fig. 2 is a horizontal section through the same on the line 2—2 in Fig. 1, showing the auxiliary air valve ring partly broken away; Fig. 3 is a horizontal section through my device on the line 3—3 in Fig. 1, showing a top view of the float chamber; Fig. 4 is a top view of my device with the throttle valve in closed position; and Fig. 5 is a partial side elevation of my device showing the throttle valve lever arrangement, and hot water connections.

My carbureter comprises two main parts, a mixing and carbureting chamber 1, and a float chamber 2, each substantially cylindrical in shape, and arranged with their axes in vertical alinement, the mixing chamber being positioned above the float chamber, and secured together as hereinafter described. The mixing chamber is formed of two parts 3, 4, connected by a screw-joint 5, the upper of which parts 3, is adapted to be attached to the pipe leading to the engine by means of a peripheral flange 6, drilled and threaded to receive screws mounted in a similar flange in the end of the pipe. The member 3 is formed with an annular chamber 7 surrounding the upper part of the mixing chamber, provided with outlets 8 at diagonally opposite points on the outer walls thereof, these outlets being provided with screw connections 9 for attaching to the ends of pipes connected with the water circulating system of the engine, that hot water may be passed through the annular chamber 7 to heat the walls of the mixing chamber.

A throttle valve 10 is mounted in the upper part of the mixing chamber to close the outlet therefrom to the pipe leading to the engine. This throttle valve is controlled by means of a crank 11 mounted outside the carbureter on the extremity of the pivot supporting the throttle valve, the limits of the movement of the throttle valve being determined by adjustable stops 12 on the upper member of the mixing chamber, arranged in the path of a lug 13 on the crank 11, as shown in Figs. 4 and 5.

The lower end of the mixing chamber 1 is contracted into a central passage 14 leading down into an annular chamber 15 formed between the lower wall 16 of the mixing chamber, which is extended in the form of a gradually contracting tube 17, and the top wall 18 of the float chamber, which is formed with a central depression 19. Annular flanges 20, 21 formed on the lower wall of the mixing chamber and upper wall of the float chamber, respectively, and screw-threaded to engage with each other, provide a rigid connection between the mixing chamber and float chamber, and at the same time completely close the outer entrance to the annular passage 15. One of these flanges is provided with a plurality of small openings 22 spaced around it at equal distances apart and all disposed at the same elevation with respect to the horizontal plane of the top of the float chamber. Surrounding this flange, which is provided with screw-threads on its exterior, is an internally threaded ring 23 adapted to be screwed up and down thereon to partly close more or less the openings 22. This ring is secured in adjusted position by means of a small spring catch 24 projecting into one of a series of vertical grooves 25 on the exterior of the ring.

In the bottom wall 16 of the mixing and carbureting chamber and surrounding the central passage 14 are arranged openings 26 spaced at equal intervals around a circle having its center on the axis of the carbureter. The top surface of the lower wall 16 of the mixing chamber is finished smooth to provide a uniform bearing for the auxiliary air valve 28, a metal ring with a smooth lower surface adapted to rest on the upper surface of the lower wall 16 of the mixing chamber and close the openings 26 therethrough in normal position. An internally threaded flanged ring 27 is adjusted on the flange 20 to partly close the holes 26, and is adjustably locked by a spring detent similar to that locking the ring 23. Surrounding the metal ring 28 is a strip of spring brass 29 previously sprung to a shape such that when assembled in position in the mixing chamber it has a bearing at points against the periphery of the ring and at other points against the inside of the cylindrical side wall of the lower part 4 of the mixing chamber. This spring strip serves to position the metal ring concentrically with respect to the axis of the carbureter, and at the same time introduces a slight amount of friction to oppose the vertical movement of the ring due to vibration of the parts or to variations in the difference of pressure between the mixing chamber and external air, resulting in a "dead beat" valve.

Liquid fuel is supplied to the carbureter through the opening 30 located centrally in the bottom of the float chamber, and fitted with a valve 31 controlled by the float 32. The pipe from the source of liquid fuel supply may be attached to the threaded extension 33 on the underside of the float chamber, through which a passage 34 leads to the valve 31 before mentioned. Projecting upward from the depressed top wall 19 of the float chamber into the central passage 14 and the lower portion of the mixing and carbureting chamber, is the spray nozzle 36, communicating with the float chamber by means of a central passage 35. The spray nozzle is closed at the top, but is provided with spray orifices 37, 37, arranged around its side wall near the top, these orifices being spaced along the axis of the spray nozzle so as to be at varying distances above the level of the liquid fuel in the float chamber.

The valve 31 has a threaded stem 38 slightly smaller in diameter than the opening 30 in the bottom of the float chamber and the passage 35 leading to the spray nozzle, which stem extends through the opening 30 and float chamber into the passage 35, thus insuring that the valve shall remain in alinement with its seat. Nuts 39, 40, adjustable on this stem, serve to position between them the spider 41 to which the float 32 is attached, which is thus vertically adjustable with respect to the valve 31, whereby the level of the liquid fuel in the float chamber may be adjusted to stand normally at any desired height whatever the specific gravity of the fuel. A drain opening closed with a plug 42 is also provided in the bottom wall of the float chamber.

Warm air is supplied to the carbureter by means of a pipe 44 leading from the region of the exhaust manifold or other hot part of the engine, to the split casing 45 surrounding the lower part of the carbureter and inclosing the sides of the float chamber and an annular space 46 surrounding the contracted lower portion of the mixing and carbureting chamber, warming the float chamber and fuel therein. A small hole 43 in the top wall 18 of the float chamber provides a means of communication between the space 46 and the interior of the float chamber. By loosening the clamping screws and nuts 47 which secure the two parts of the split casing 45 together and to the walls of the mixing chamber, the casing may be slipped down far enough to permit access to the rings 23 and 27 for adjusting them.

The operation of my device is as follows: Liquid fuel being admitted to the float chamber through the supply pipe will rise therein until the float is raised high enough to shut off the supply at the valve 31, the level of liquid fuel in the float chamber being kept normally slightly below the top of the float in the closed position of the valve 31, but owing to the sluggish action of the float and valve, and variations in the rate of consumption of the fuel, the level of the liquid will vary considerably in actual service, and at times the float chamber may be nearly empty, while at other times it may be filled to the top wall.

Upon starting up the engine the pressure in the pipe leading thereto from the carbureter will be greatly reduced, and if the throttle valve 10 be partly or fully open the pressure in the mixing chamber will fall to approximately the same degree or amount. As the liquid in the float chamber is under atmospheric pressure, on account of the hole 43 providing open communication with the space 46, the moment the pressure in the mixing chamber is reduced some liquid will be forced through the passage 35 into the spray nozzle 36, and will issue from the orifices 37 at the upper extremity thereof into the mixing and carbureting chamber in the form of jets. Meanwhile air has been passing through the openings 22 and the passages 15 and 14 into the mixing chamber past the orifices 37 from which the jets of liquid fuel are issuing, and as this air is more or less warmed before entering the carbureter it takes up this fine spray of liquid fuel and vaporizes it, forming an explosive gaseous mixture. The area of the openings 22 can be varied to allow more or less air to pass at a given difference of pressures, as may be required to form a gaseous mixture of the desired richness.

If the difference in pressure between the pressure in the mixing chamber and that of the external air in the space 46 surrounding the mixing chamber is great enough the valve ring 28 will be lifted more or less, depending on the amount of unbalanced pressure, and the openings 26 uncovered, thus allowing more or less air to rush into the mixing chamber to equalize the pressures; but this action will not take place until the difference in pressures is considerable, as when the throttle valve is fully opened or the engine is running at high speed. The advantage of this graduated additional air supply is in preventing the gaseous mixture from being too rich under these varying conditions. The relative weight of the ring and size of the openings 26 determine at what difference of pressures this action shall take place, and may be so chosen as to give the desired results. The relative proportions indicated on the drawings have been found to give excellent results with the ring made of brass. In order to adapt the carbureter to varying atmospheric conditions the area of the free passage through the openings may be adjusted by raising or lowering the flanged ring 27.

The particular advantages of my carbureter lie in warming the entering air, in surrounding the float chamber with a jacket of warm air to make the liquid fuel vaporize readily, and in surrounding the mixing chamber with a jacket of hot water to insure complete vaporization of the liquid fuel; in placing the orifices in the spray nozzle at a considerable distance above the normal level of the liquid fuel in the float chamber, thus minimizing the variation in the amount of fuel fed under constant difference of pressures, or suction, on account of variations in the level of the liquid fuel in the float chamber; the provision of a plurality of orifices in the spray nozzle at different elevations above the level of liquid fuel in the float chamber, whereby the number of orifices functioning to deliver fuel depends on the amount of the difference in pressure within and without the mixing chamber, or degree of suction; the peculiar proportions and arrangement of air passages resulting in a very effective mixing of the air and fuel; the arrangement of parts automatically controlling the richness of the mixture; and the possibility of adjustment to meet varying conditions of the atmosphere as well as different densities of liquid fuel; all combined one compact device.

It is evident that many of these advantages may be obtained in various ways, some of which are not novel, but

What I claim as my invention, and desire to secure by Letters Patent is as follows:

1. In a carbureter, in combination with a concentric mixing and carbureting chamber and a float chamber in vertical axial alinement, means concentrically arranged in said float chamber adapted to maintain liquid fuel at a constant level therein, and a spray nozzle concentric with said float chamber and having a series of vertically spaced orifices the lowest of which is positioned not less than one and one-quarter inches above said liquid fuel level.

2. In a carbureter, in combination with a concentric axial vertically disposed mixing and carbureting chamber and a float chamber, said float chamber being secured to said mixing and carbureting chamber by means of a flange and formed with a central depression in its top wall, a tubular extension on the lower wall of said mixing and carbureting chamber, said extension projecting nearly to the bottom of said central depression in the float chamber, a spray nozzle extending upward from the float chamber within said tubular extension, an annular air space surrounding the flange connecting said chambers and communicating with the space between the top wall of the float chamber and said tubular extension by means of openings in said flange, and means for partly closing said openings.

3. In a carbureter, in combination with a concentric axial vertically disposed mixing and carbureting chamber and a float chamber, said float chamber being secured to said mixing and carbureting chamber by means of a flange, an annular air space surrounding said flange, passages through the lower wall of said mixing and carbureting chamber into said annular air space, an automatic valve controlling said passages, openings through said flange into passages leading to said mixing and carbureting chamber, and means for partly closing said openings.

4. In a carbureter, a circular walled mixing and carbureting chamber having a concentric spray nozzle, means for admitting air past said spray nozzle, a concentric partition forming part of the lower wall of said mixing and carbureting chamber, said partition being located below the extremity of said spray nozzle and provided with spaced openings therethrough for supplying additional air to said mixing and carbureting chamber, a weight valve seated on said partition and closing said openings in normal position, and a throttle valve in the outlet passage from said mixing and carbureting chamber.

5. In a carbureter, a circular walled mixing and carbureting chamber having a concentric spray nozzle, means for admitting air past said spray nozzle, a concentric partition forming part of the lower wall of said mixing and carbureting chamber, said partition being provided with openings therethrough for supplying additional air to said mixing and carbureting chamber, adjustable means for partly closing said openings, a weight valve seated on said partition and closing said openings in normal position and a throttle valve in the outlet passage from said mixing and carbureting chamber.

6. In a carbureter, a circular walled mixing and carbureting chamber having a concentric spray nozzle, means for admitting air past said spray nozzle, a concentric partition forming part of the lower wall of said mixing and carbureting chamber, said partition being provided with openings therethrough for supplying additional air to said mixing and carbureting chamber, a weight valve seated on said partition and closing said openings in normal position, spring means for positioning said weight valve centrally on said partition, said spring means tending to prevent movement of said valve vertically with respect to said diaphragm, and a throttle valve in the outlet passage from said mixing and carbureting chamber.

7. In a carbureter comprising an externally cylindrical mixing and carbureting chamber and a float chamber vertically arranged on the same axis, the mixing and carbureting chamber being of slightly greater diameter than the float chamber, a split casing adapted to be clamped to the lower side wall of the mixing and carbureting chamber and extending down outside the float chamber to provide a space therebetween, said casing being provided with an inturned flange at its lower end to meet the bottom of the float chamber, and means for supplying warm air to said casing.

8. In a carbureter comprising an externally cylindrical mixing and carbureting chamber and a float chamber vertically arranged on the same axis, and connected by screw flanges on the lower and upper walls of each respectively, openings through one of said flanges into passages leading to the mixing and carbureting chamber, and an internally threaded ring arranged on the exterior of said flange and adapted to partly close said openings.

9. In a carbureter comprising an externally cylindrical mixing and carbureting chamber and a float chamber vertically arranged on the same axis, and connected by screw flanges on the lower and upper walls of each respectively, openings through one of said flanges into passages leading to the mixing and carbureting chamber, an internally threaded ring arranged on the exterior of said flange and adapted to partly close said openings, spaced notches on the exterior of said ring, and a spring detent adapted to coöperate with said notches to maintain the ring in adjusted position on said flange.

Signed at St. Louis, Missouri, this 5th day of September, 1911.

WALTER P. GRATH.

Witnesses:
A. M. HOLCOMBE,
M. A. SHELTON.

Copies of this patent may be obtained for five cents each, by addressing the "Commissioner of Patents, Washington, D. C."